United States Patent [19]

Wolfe et al.

[11] 4,057,508

[45] Nov. 8, 1977

[54] X-RAY PHOSPHORS WITH LOW AFTERGLOW

[75] Inventors: Robert Wade Wolfe, Wysox; Russell Francis Messier, Furnace, both of Pa.

[73] Assignee: GTE Sylvania Incorporated, Stamford, Conn.

[21] Appl. No.: 746,414

[22] Filed: Dec. 1, 1976

[51] Int. Cl.$^2$ .............................................. C09K 11/46
[52] U.S. Cl. ............................................. 252/301.4 H
[58] Field of Search ................................. 252/301.4 H

[56] References Cited

U.S. PATENT DOCUMENTS

| 2,303,917 | 12/1942 | Dietz | 252/301.4 H X |
| 2,303,963 | 12/1942 | Uhle | 252/301.4 H X |
| 2,409,174 | 10/1946 | Dietz | 252/301.4 H |
| 3,163,610 | 12/1964 | Yocom | 252/301.4 H |
| 3,951,848 | 4/1976 | Wolfe et al. | 252/301.4 H |
| 3,988,252 | 10/1976 | Ferretti | 252/301.4 H |

OTHER PUBLICATIONS

Tangvy et al., "Material Research Bull.", vol. 9, pp. 831–836, 1974.
Philips, "Chemical Abstracts", vol. 80, 1974.

*Primary Examiner*—Jack Cooper
*Attorney, Agent, or Firm*—Norman J. O'Malley; Donald R. Castle; John C. Fox

[57] ABSTRACT

In europium-activated alkaline earth mixed halide x-ray phosphor compositions the addition of minor amounts of yttrium significantly reduces afterglow or persistance. A syngeristic effect upon the reduction of afterglow is observed when both yttrium and lithium additives are both included. Additions of other rare earths and alkali metals are not effective to reduce afterglow. The effective amount of Y is from about 0.001 to about 0.1 moles of yttrium per mole of host. When lithium is used in conjunction with yttrium, about 0.001 to about 0.1 moles of lithium per mole of host is used.

6 Claims, No Drawings

X-RAY PHOSPHORS WITH LOW AFTERGLOW

BACKGROUND OF THE INVENTION

1. Field of the Invention

This invention relates to europium-activated alkaline earth mixed halide x-ray phosphors. More particularly it relates to barium fluorochloride and barium-strontium fluorochloride activated by europium.

2. Prior Art

Europium-activated barium fluorochloride and barium-strontium fluorochloride are known x-ray phosphors. One of the important properties of any x-ray phosphor is to produce bright light within the spectral range of the film with which it is being used. Most research work heretofore has been concentrated on improving the brightness of the emitted light in order that the time of exposure to x-rays is decreased.

One of the other important characteristics of x-ray phosphor is the time that the phosphor continues to glow after the exposure to x-rays has ceased (afterglow). Ideally there should be an instanteous response, however, this is never achieved. As can be appreciated, continued emission after x-ray bombardment has ceased may cause "ghost" image upon the subsequent film.

Additives have been used in calcium tungstate x-ray phosphors to reduce afterglow. Vanadium addition was found to be effective. An additive used to reduce afterglow cannot significantly decrease the brightness of the emission nor can it significantly decrease the power of the host to stop x-rays.

None of the known prior art has given any guidance to the problems associated with afterglow in the europium-activated alkaline earth mixed halide system. As used herein the term "alkaline earth mixed halide" refers to a host represented by the formula:

$$Ba_{1-x}Sr_xFCl$$

wherein $x$ is from 0 to about 0.3. Also within the context of this disclosure, the activator is europium. While divalent europium can be used alone, in our U.S. patent application Ser. No. 698,058, filed June 21, 1976, we have shown that the presence of some trivalent europium is beneficial. Thus, the europium activator can be divalent europium of mixtures of divalent and trivalent europium as taught in the aforementioned application which is incorporated by reference herein.

It is believed that an alkaline earth mixed halide activated by europium having a significantly reduced afterglow would be an advancement in the art.

OBJECTS AND SUMMARY OF THE INVENTION

It is an object of this invention to provide an alkaline earth mixed halide x-ray phosphor activated by europium having a reduced afterglow.

It is a further object of this invention to provide an alkaline earth mixed halide x-ray phosphor activated by europium containing, as an afterglow reduction additive, minor amounts of yttrium or minor amounts of both yttrium and lithium.

These and other objects of the invention are achieved in one aspect by a composition represented by the formula:

$$Ba_{1-x}Sr_xFCl:yEu.aY.bLi$$

wherein $x$ is from about 0 to about 0.3 $y$ is from about 0.002 to about 0.2. $a$ is from about 0.001 to about 0.1 $b$ is from 0 to about 0.1

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

Yttrium addition to the alkaline earth mixed halide phosphor reduces the afterglow (also known as persistence or lag) without any measurable effect upon brigntness. Halide salts are the preferred source of yttrium because no ions are introduced that are not common to the host. Yttrium fluoride is especially preferred.

Afterglow is measured by a test as described below: A suitable cassette shall be loaded with the screens under test but without a film. Prior to test, screens shall be rested for 24 hours. The temperature of the screens during the test shall be 77° ±2° F. Several metal coins or other roentgenopaque test objects shall be placed on the front of the cassette and exposed for one minute at radiation of 100 kV$_p$, 2 mA, and 20-inch target-to-screen distance. The cassette shall then be taken to the darkroom and exactly 30 seconds after the termination of the roentgen exposure, the cassette shall be opened and an unexposed piece film shall be quickly inserted between the screens and the cassette shall be closed. After remaining in the closed cassette for 5 minutes, the film shall be removed and processed, washed and dried. Examine the film for evidence of shadows of the test objects.

As was previously mentioned, lithium in conjunction with yttrium produces a larger reduction in afterglow than would be anticipated from either additive used alone. Lithium chloride has been previously used for brightness enhancement and thus the use of lithium chloride alone in not novel. The effects upon afterglow were unobserved and unappreciated. When lithium is used in conjunction with yttrium, lithium halides are used, however, lithium chloride is preferred.

The yttrium halide or optionally lithium halide and yttrium halide are admixed with host and activator raw materials and other brightness enhancement additives such as aluminum hydroxide, prior to heating to produce a luminescent material. Firing temperatures range from about 500° C to about 800° C, however, about 650° C is the preferred temperature. The general procedure for producing alkaline earth mixed halides is found in our U.S. Pat. No. 3,951,848, issued Apr. 20, 1976 which is incorporated herein by reference. As previously mentioned it is desirable to have some trivalent europium present as an activator thus the atmosphere during firing is a non-reducing atmosphere so that a mixture of Eu$^{+2}$ and Eu$^{+3}$ is produced. Any of the brightness enhancement additives that are given U.S. Pat. No. 3,951,848 can be incorporated, however, the effect upon afterglow is independent of the brightness enhancement additives.

As previously mentioned the compositions of this invention can be represented by the formula:

$$Ba_{1-x}Sr_xFCl:yEu.aY.bLi$$

wherein $x$ is from 0 to about 0.3 $y$ is from about 0.002 to about 0.2 $a$ is from about 0.001 to about 0.1 $b$ is from 0 to about 0.1

Preferred values of $x$ are from about 0.005 to about 0.1 of $a$ are from about 0.003 to about 0.05, and of $b$ are from about 0.001 to about 0.05. Especially preferred compositions are those of the above formula having $x$ from about 0.01 to about 0.07, $y$ from about 0.05 to about 0.15, $a$ from about 0.003 to about 0.05, and $b$ from about 0.001 to about 0.05.

To more fully illustrate the subject invention the following detailed examples are presented. All parts, proportions, and percentages are by weight unless otherwise indicated.

EXAMPLE I

About 977.7 parts of $BaCl_2.2H_2O$, about 634 parts of $BaF_2$, about 51.3 parts of $SrF_2$, about 19.2 parts of $2EuCl_3.EuOCl$ and about 6.2 parts of $Al(OH)_3$ are mixed to form a relatively uniform admixture. The admixture is heated in a dry nitrogen atmosphere at about 650° C for about 4 hours. After washing, drying, and screen to −400 mesh a sample is tested for afterglow following a procedure as described previously. A relative afterglow value of about 2.55 is observed.

EXAMPLE II

The procedure given in Example I is followed except that appropriate amounts of $YF_3$ and $Li_2$ are added to yield compositions containing the following levels of Y and Li.

| Composition | Y Level moles/mole host | Li Level moles/mole host |
|---|---|---|
| 1 | 0.01 | 0 |
| 2 | 0.033 | 0 |
| 3 | 0 | 0.0033 |
| 4 | 0 | 0.01 |
| 5 | 0 | 0.033 |
| 6 | 0.01 | 0.01 |
| 7 | 0.033 | 0.033 |
| 8 | 0.10 | 0.10 |
| Control | 0 | 0 |

Samples of the nine compositions prepared above are tested for afterglow using the same procedure as given in Example I. Results of these tests are as follows:

| Composition | Relative Afterglow Value |
|---|---|
| 1 | 2.2 |
| 2 | 2.1 |
| 3 | 1.7 |
| 4 | 1.7 |
| 5 | 1.9 |
| 6 | 1.1 |
| 7 | 1.15 |
| 8 | 1.4 |
| Control | 2.7 |

As can be seen, the reduction in afterglow with yttrium alone is effective, however, the combination of Y and Li is much greater than would be expected from either one alone. The above results are achieved when the firing temperature is varied from about 500° C to about 800° C.

EXAMPLE III

Compositions of barium fluorochloride containing 0.01 moles of europium as an activator are prepared following the procedure given in Example I, except that the temperature is about 675° C and the time of firing is about 2 hours. Sample A contains no additive to reduce afterglow while in Samples B, C, and D the level of $YF_3$ is varied to produce compositions containing 0.005, 0.01, and 0.03 moles Y/mole BaFCl respectively. Samples A, B, C, and D, after being processed in the normal manner, are tested for relative afterglow and relative brightness. Table I shows the results of these tests.

| Sample | Relative Brightness | Relative Afterglow Value |
|---|---|---|
| A | 195 | 2.09 |
| B | 195 | 1.12 |
| C | 195 | 0.8 |
| D | 194 | 0.7 |

As can be seen the yttrium addition has no adverse effect upon brightness and effectively reduces afterglow. Other rare earths such as cerium and gadolinium are ineffective to reduce afterglow as no appreciable reduction is observed or emission characteristics of the material are adversely affected when these materials are added at the foregoing levels. Sodium and potassium additions also do not reduce afterglow.

While there has been shown and described what are at present considered the preferred embodiments of the invention, it will be obvious to those skilled in the art that various changes and modifications may be made therein without departing from the scope of the invention as defined by the appended claims.

What is claimed is:

1. An x-ray luminescent composition consisting essentially of an activated host represented by the formula:

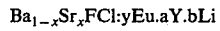

$Ba_{1-x}Sr_xFCl:yEu.aY.bLi$ wherein $x$ is from 0 to about 0.3 $y$ is from about 0.002 to about 0.2 $a$ is from about 0.001 to about 0.1 $b$ is from 0 to about 0.1, having a smaller afterglow than an X-ray luminescent composition consisting essentially of

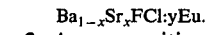

$Ba_{1-x}Sr_xFCl:yEu.$

2. A composition according to claim 1 wherein $b$ is from about 0.001 to about 0.05.

3. A composition according to claim 1 wherein $x$ is from about 0.005 to about 0.1.

4. A composition according to claim 1 wherein $x$ is from about 0.01 to about 0.07, $y$ is from about 0.05 to about 0.15, $a$ is from about 0.003 to about 0.05 and $b$ is from about 0.001 to about 0.05.

5. A composition according to claim 1 wherein $a$ is from about 0.003 to about 0.05.

6. A composition according to claim 5 wherein $b$ is from about 0.001 to about 0.05.

* * * * *

UNITED STATES PATENT AND TRADEMARK OFFICE
CERTIFICATE OF CORRECTION

PATENT NO. : 4,057,508
DATED : November 8, 1977
INVENTOR(S) : Robert W. Wolfe and Russell F. Messier It is certified that error appears in the above-identified patent and that said Letters Patent are hereby corrected as shown below:

Col. 1, line 14 - After "spectral" and before "range" please insert -- sensitivity --.

Col. 1, line 46 - Please delete "of", first occurrence, insert -- or-

Col. 2, line 42 - Please delete "in" and insert -- is --.

Col. 3, line 29 - Please delete "$Li_2$" and insert -- Li --.

Signed and Sealed this

Thirtieth Day of May 1978

[SEAL]

Attest:

RUTH C. MASON
Attesting Officer

LUTRELLE F. PARKER
Acting Commissioner of Patents and Trademarks